United States Patent [19]

Rosaen

[11] 4,282,761
[45] Aug. 11, 1981

[54] FLUID FLOW METER

[76] Inventor: Nils O. Rosaen, 5490 Waldon, Clarkston, Mich. 48016

[21] Appl. No.: 67,444

[22] Filed: Aug. 20, 1979

[51] Int. Cl.³ .............................................. G01F 1/22
[52] U.S. Cl. .............................................. 73/861.58
[58] Field of Search ..................... 73/207, 210, 861.52, 73/861.58

[56] References Cited

U.S. PATENT DOCUMENTS

| | | | |
|---|---|---|---|
| 1,603,924 | 10/1926 | Rossman | 73/210 |
| 3,218,853 | 11/1979 | Ongaro | 73/210 |
| 3,234,790 | 2/1966 | Ekstrom | 73/210 |
| 3,282,103 | 11/1966 | Steele | 73/208 |
| 3,889,535 | 6/1975 | Bull et al. | 73/210 |
| 3,910,112 | 10/1975 | Geriach | 73/210 |
| 4,064,751 | 12/1977 | Deisenroth et al. | 73/207 |

FOREIGN PATENT DOCUMENTS

| | | | |
|---|---|---|---|
| 2511147 | 9/1976 | Fed. Rep. of Germany | 73/210 |
| 1336762 | 7/1963 | France | 73/210 |

Primary Examiner—Herbert Goldstein
Attorney, Agent, or Firm—Gifford, VanOphem, Sheridan & Sprinkle

[57] ABSTRACT

A fluid flow meter is provided and comprises a housing having a fluid inlet and a fluid outlet and a fluid passage for connecting the inlet with the outlet. The fluid passage further includes an elongated cylindrical chamber having one end open to the inlet and the other end open to the outlet while a piston is axially slidably mounted within this housing chamber and is movable between a first and second position. The outer periphery of the piston is sealed with respect to the housing. The piston includes a removable orifice plate having a fluid port open to the inlet end of the chamber while a fluid passage formed through the piston fluidly connects the port with the outlet end of the chamber. A rod is positioned within the housing and held in place by removable housing end covers. The rod includes a tapered portion positioned through the port which variably restricts the port in dependence upon the axial position of the piston. A resilient member urges the piston towards the inlet end of the chamber while an indicator is connected to the piston to provide an exteriorly visible signal of the axial position of the piston member and thus of the flow through the flow meter. Further, the piston assembly is constructed as a cartridge assembly so that the top cover can be removed and a new cartridge assembly installed quickly and easily. A set point is provided so that the new cartridge can be quickly zeroed.

14 Claims, 6 Drawing Figures

FLUID FLOW METER

BACKGROUND OF THE INVENTION

1. Field of the Invention

The present invention relates generally to fluid flow meters and, more particularly, to a fluid flow meter in which the fluid flow range can be easily varied.

2. Description of the Prior Art

There have been a number of previously known fluid flow meters having a housing with a fluid inlet, a fluid outlet and means for measuring and exteriorly indicating the fluid flow from the inlet and to the outlet. For example, in one type of previously known fluid flow meters, a semicircular vane cooperates with a hemispherical shaped housing disposed between the fluid inlet and the fluid outlet. Rotation of the vane provides a variable size opening between the vane and the housing while resilient means urges the vane towards a closed position. The rotation of the vane within the housing, caused by the fluid flow into the housing inlet, is used to provide an exteriorly visible signal of the vane rotation and, thus, of the fluid flow rate through the housing.

In a still further type of fluid flow meter, a tapered needle cooperates with a port which fluidly connects the inlet to the outlet. In addition, a piston is axially slidably mounted within the housing and secured to either the tapered needle or the port so that the displacement of the piston caused by the fluid flow through the flow meter variably opens the port in dependence upon the flow rate. Electrical and/or mechanical indicating means are attached to the piston member to provide a signal of the axial displacement of the piston and hence of the fluid flow rate through the flow meter.

One disadvantage of these previously known flow meters is that the flow range for the flow meter is preset and nonadjustable after assembly of the flow meter. Consequently, if a different flow range for the flow meter is desired, it is necessary to replace the entire flow meter.

SUMMARY OF THE PRESENT INVENTION

The present invention overcomes the above mentioned disadvantages of these previously known flow meters by providing a flow meter in which the flow range of the flow meter can be simply and rapidly adjusted or changed in the field as desired. Moreover, as will hereafter become apparent, the flow meter of the present invention is of simple and yet durable construction.

In brief, the flow meter according to the present invention comprises a housing having a fluid inlet, a fluid outlet and fluid passage means for fluidly connecting the inlet to the outlet. The fluid passage means also includes an elongated chamber, preferably cylindrical in shape, having one end open to the inlet and its other end open to the outlet.

A piston assembly is axially slidably mounted within the housing chamber and movable between a first position and a second position. An O-ring fluidly seals the outer periphery of the piston assembly to the chamber wall while a helical spring urges the piston towards the inlet end of the housing chamber.

The piston assembly further includes an orifice plate having a fluid port open to the inlet end of the fluid chamber. A fluid passageway is formed through the piston assembly for connecting the fluid port to the outlet end of the housing chamber. A rod is also held to the housing covers and extends coaxially through the housing chamber and thus coaxially through the piston assembly and its fluid port. Moreover, the rod includes a tapered portion which is positioned within the port as the piston assembly moves between its first and second position to thereby variably restrict the port in dependence upon the axial position of the piston assembly.

In operation, fluid flow into the housing inlet urges the piston assembly toward the outlet end of the fluid chamber and against the force of the helical spring thus increasing the effective area of the piston assembly port in an amount proportional to the fluid flow through the flow meter. The axial displacement of the piston in turn is exteriorly visibly indicated by means of a needle mechanically linked to the piston.

The flow meter housing further includes a removable end cover plate through which the orifice plate can be removed from the housing and replaced with an orifice plate having a different size port. The replacement of the orifice plate with a different size port in effect changes the effective flow range of the flow meter in accordance with the size of the port. Alternatively, the entire piston assembly can be replaced to change the flow range of the flow meter.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 1:
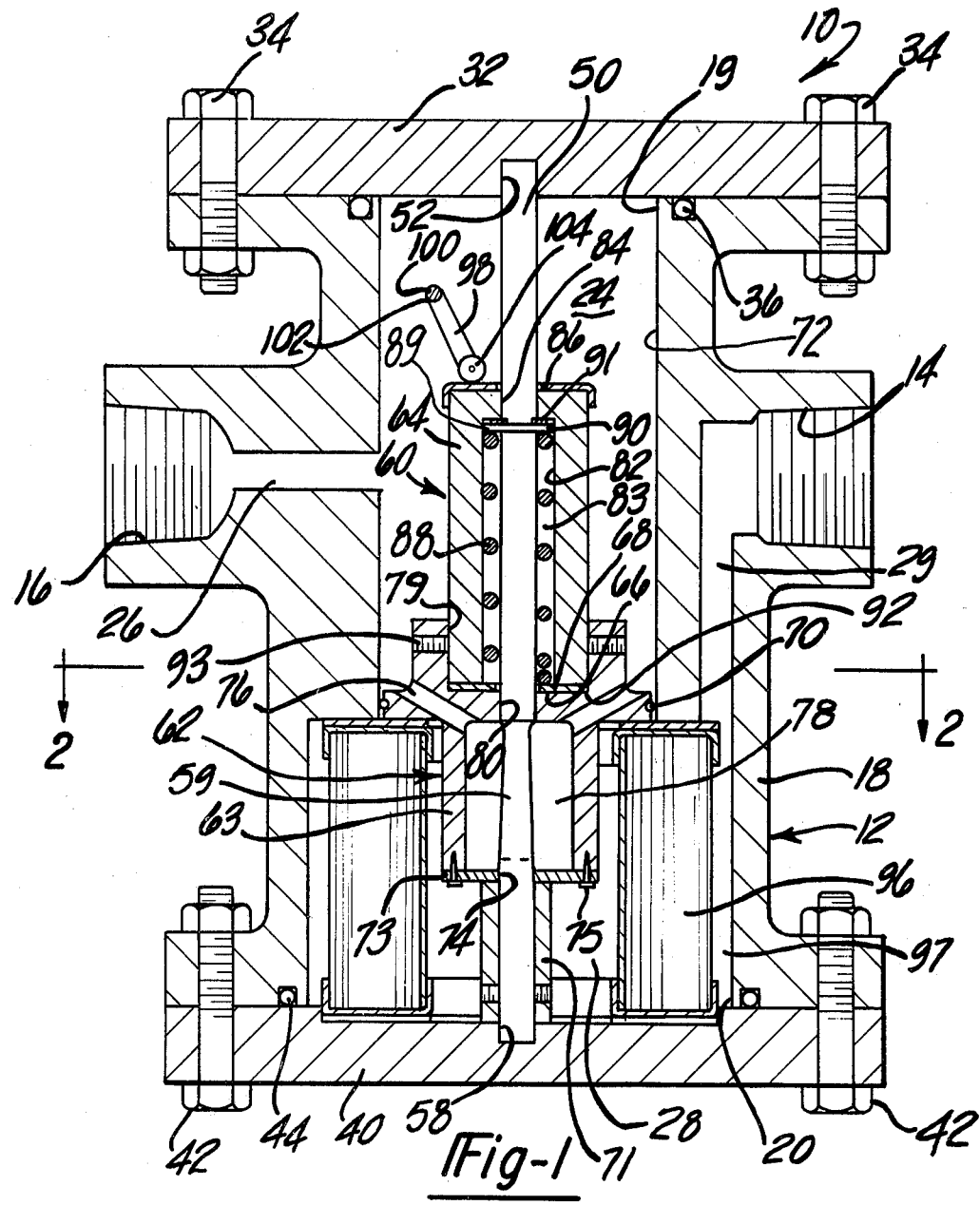
FIG. 1 is a longitudinal sectional view illustrating the flow meter according to the present invention.

With reference first to FIG. 1, the flow meter 10 according to the present invention is thereshown and comprises a housing 12 having a fluid inlet 14 and a fluid outlet 16. Both the housing inlet 14 and outlet 16 are internally threaded for connection with conventional fluid fittings (not shown) which in turn are connected to a fluid system (not shown).

Figure 2:
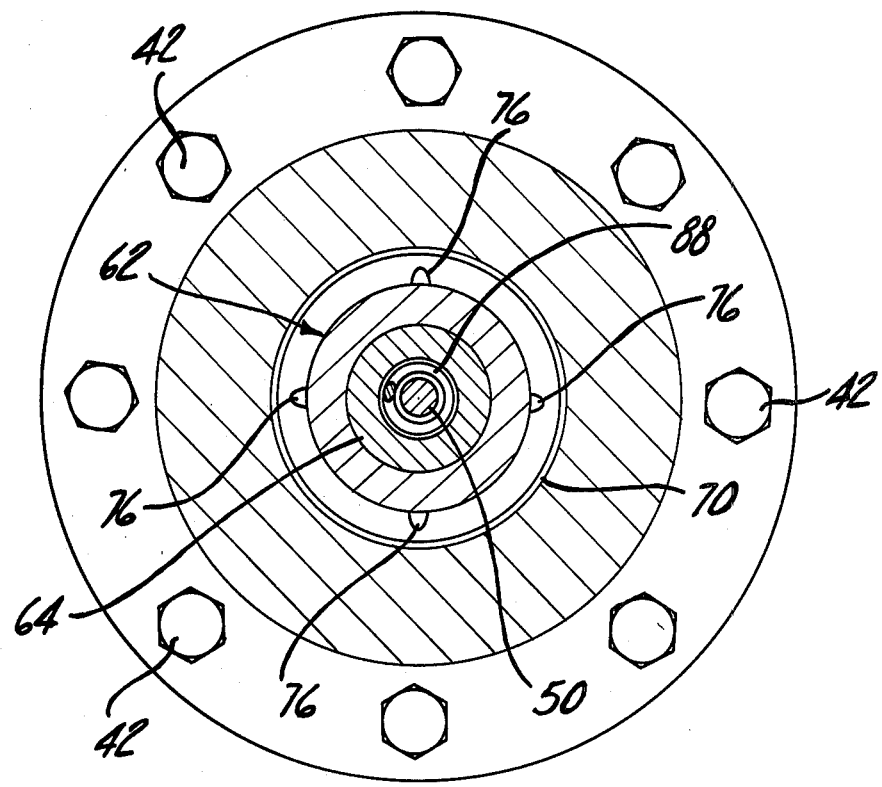
FIG. 2 is a cross-sectional view taken substantially along line 2—2 in FIG. 1.

Referring now to FIGS. 1 and 2, the housing 12 further comprises a tubular and cylindrical outer housing wall 18 which is open at both ends 19 and 20. The housing 12 thus forms an elongated cylindrical chamber 24 having one end fluidly connected by a fluid passageway 26 to the fluid outlet. Similarly, the opposite end of the fluid chamber 24 is open to the fluid inlet 14 via a cylindrical fluid chamber 28 and a fluid passageway 29.

The end 19 of the housing 12 is covered by a closure cap 32 and secured in place by bolts 34. Appropriate seal means 36 are provided between the closure cap 32 and the housing 12 in order to prevent fluid leakage. Similarly, the opposite end 20 of the housing 12 is covered by an end cover 40 and removably secured to the housing 12 by bolts 42. Appropriate sealing means, such as an O-ring 44, are provided between the end 20 of the housing 12 and the closure plate 40 to prevent fluid leakage from the housing 12.

An elongated rod 50 extends coaxially through the housing chamber 24 and has one end positioned within a recess 52 in the closure cap 32. Similarly, the opposite end of the rod 50 is positioned within a recess 58 in the cover 40. The cover 40, however, can be readily removed from the rod 50 for a reason to become hereafter apparent. Moreover, the rod 50 includes a tapered portion 59 which tapers radially inwardly for a distance along a mid portion of the rod 50.

A piston assembly 60 is axially slidably mounted within the housing chamber 24 and includes a first piston part 62 having a body 63 and a second piston part 64. The piston parts 62 and 64 are coaxial with each other but axially adjacent so that one end 66 of the second piston part 64 abuts against one end 68 of the first piston part 62.

Still referring to FIG. 1, a fluid seal ring 70, such as an O-ring, is secured to the outer periphery of the first piston part 62 and fluidly seals the first piston part 62 to the interior walls 72 of the housing chamber 24. The seal 70, however, permits the first housing part 62 to axially slide along the housing chamber 24.

The first piston part 62 further includes an orifice plate 73 having a fluid port 74 and which is removably secured to the piston body 63 by screws 75. The fluid port 74 is open to the fluid chamber 28 and thus to the inlet 14. A fluid chamber 78 within the interior of the first piston part 62 in conjunction with the plurality of circumferentially spaced and substantially radially extending fluid passageway 76 (FIGS. 1 and 2) fluidly connects the port 74 to the fluid outlet 16 of the housing chamber 24.

The first piston part 62 further includes a through bore 80 which is coaxial with the port 74. The rod 50 extends coaxially through the port 74 and through bore 80 so that the tapered portion 59 of the rod 50 is disposed in between the through bore 80 and the port 74. The tapered portion 59 of the road 50 tapers radially inwardly from the orifice plate 73 and to the opposite end of the chamber 78. In addition, a tubular stop 71 limits the downward travel of the piston assembly 60.

The second piston part 64 is cylindrical in shape and includes a longitudinal recess 82 greater in diameter than the rod 50 thus forming an annular chamber 83 between the second piston part 64 and the rod 50. The rod 50 extends coaxially through the recess 82 and also through a bore 83 formed at the other end 86 of the second piston part 64.

A helical spring 88 is positioned within the annular chamber 83 and abuts at one end 89 against a spring retainer 90 secured to the rod 50 by a snap ring 91. At its other end, the spring 88 abuts against a washer 92 positioned around the rod 50. The end 66 of the second piston part 64 is positioned within a cylindrical cavity 79 at the upper end 68 of the first piston part 62 and the piston parts 62 and 64 are then secured together by sets of screws 93. By this construction the entire piston assembly 60 can shift upwardly (as viewed in the drawing) along the rod 50 from the position shown in FIG. 1 and to the position shown in FIG. 3. In doing so, the piston assembly 60 will compress the spring 88 between the spring retainer 90 and the washer 92.

With reference now to FIG. 1, in the preferred form of the invention, a tubular cylindrical filter element 96 is positioned within the fluid chamber 28. The filter element 96 is spaced radially inwardly from the outer walls of the chamber 28 and thus defines an annular chamber 97 which is open to the inlet passageway 29. The filter element 96 is thus effectively positioned in between the fluid inlet 14 and the piston assembly 60. The filter element 96 prevents debris which may be contained within the influent from entering into and possibly clogging the fluid passageways formed through the first piston part 62. Moreover, the filter element 96 can be easily removed for cleaning and/or replacement by simply removing the end cover 40 as required.

Figure 5:
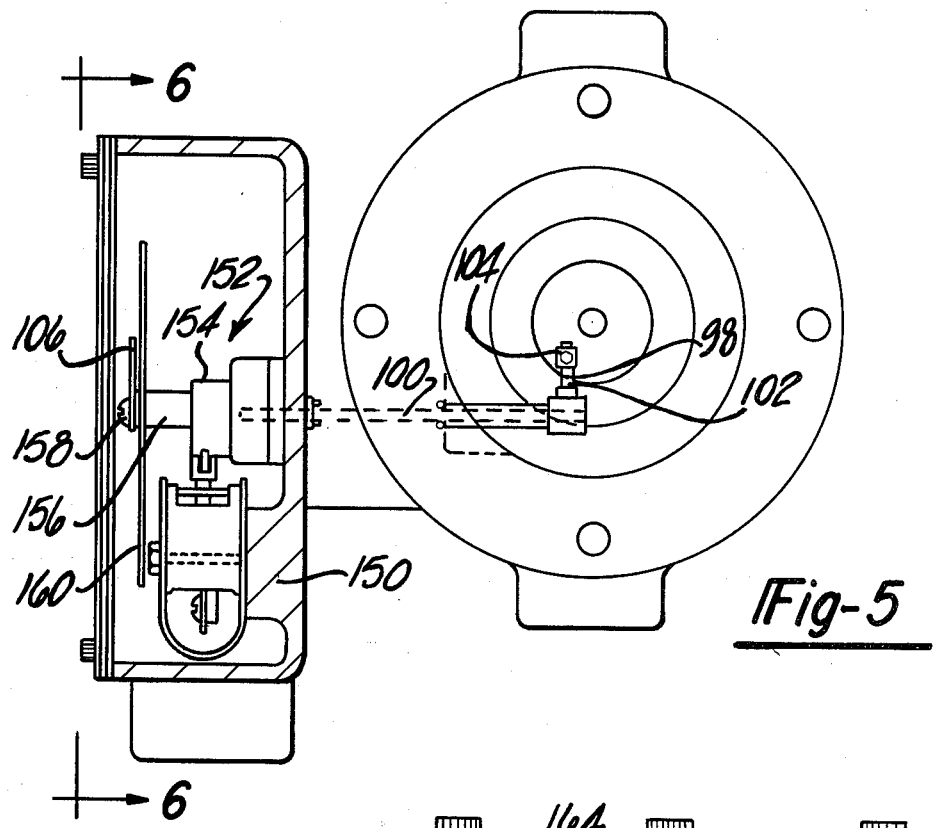
FIG. 5 is a partial sectional top view illustrating the indicating means for the flow meter.
Figure 6:
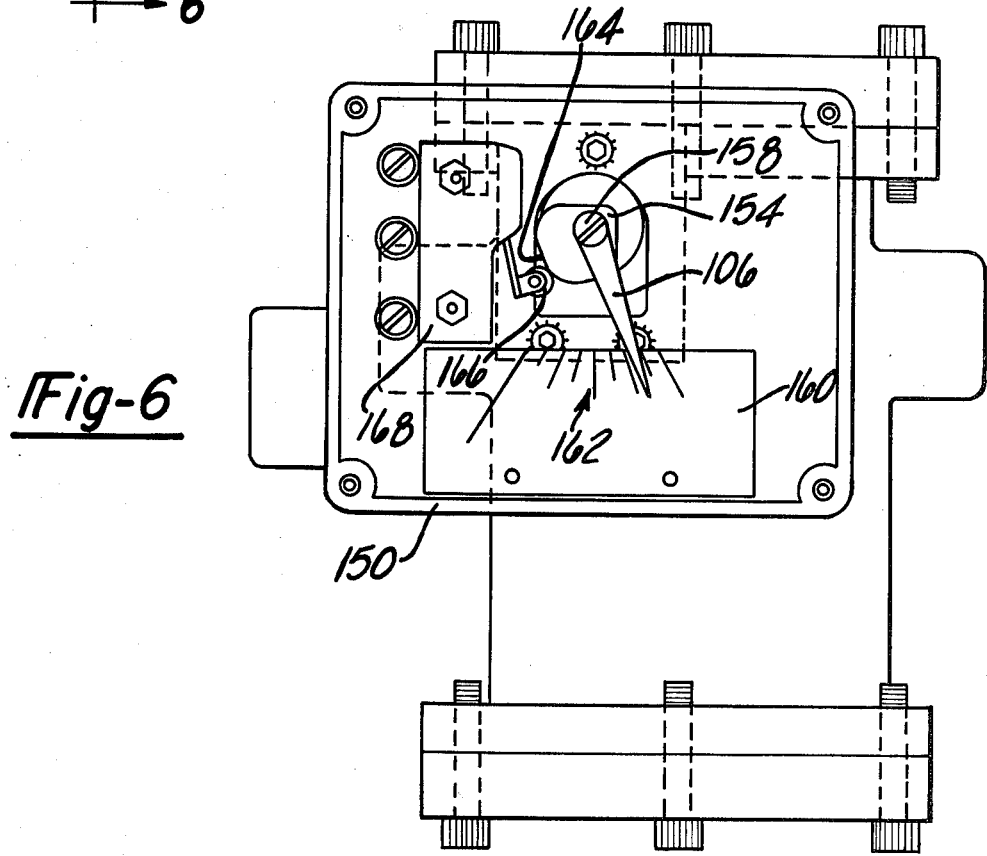
FIG. 6 is a view taken substantially along line 6—6 in FIG. 5.

With reference now to FIGS. 1, 5 and 6, a lever arm 98 is perpendicularly secured to a shaft 100 at one end 102 and, at its other end has a roller 104 which abuts against the free end 86 of the second piston part 64. The shaft 100 is rotatably journalled within the housing 12 and extends into an indicator housing 150 secured to the housing 12.

An indicator assembly 152 is secured to the other end of the shaft 100 within the interior of the indicator housing 150. The indicator assembly 152 includes a cam 154 and a stem 156 which is coaxial with the shaft 100. An indicator needle 106 is secured by a screw 158 to the stem 156 so that the needle 106, stem 156 and cam 154 rotate in unison with the shaft 100.

An indicia plate 160 having an appropriate scale 162 is mounted within the indicator housing 150 so that upon rotation of the shaft 100, the needle 106 sweeps across the scale 162 and provides an exteriorly visible indication of the rotation of the shaft 100. In addition, the cam 154 has a cam surface 164 which cooperates with a cam follower 166. The cam follower 166 in turn is mounted to a switch 168 so that when the needle 106 reaches a predetermined position, the switch 168 is activated. The switch 168 can be connected, for example, to an alarm system.

Figure 3:
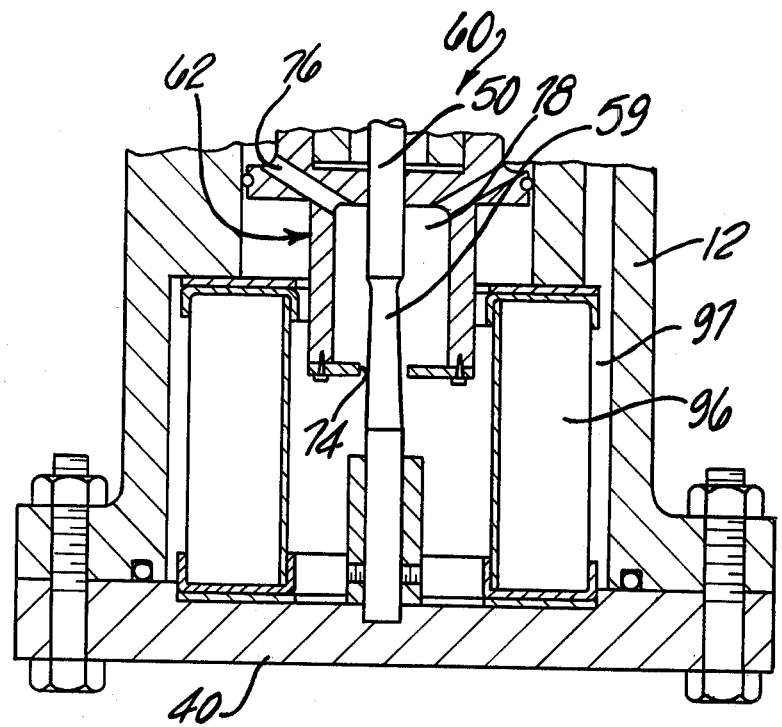
FIG. 3 is a fragmentary sectional view illustrating the operation of the flow meter of the present invention.

Referring now to FIGS. 1 and 3, in operation, fluid flow into the housing inlet 14 passes into the annular chamber 97, through the filter element 96 and to the opposite end of the housing chamber 24. This fluid flow urges the piston assembly 60 upwardly as shown in FIG. 3 against the force of the helical spring 88 and, in doing so, increases the effective area of the fluid port 74 due to the tapered portion 59 of the rod 50. Fluid flow through the port 74 enters into the piston chamber 78, passes out through the fluid passageways 76 and ultimately passes out through the housing outlet 16 via passageway 26. Moreover, as the volumetric fluid flow through the flow meter 10 increases, it will likewise increase the axial displacement of the piston assembly 60 by an increasing amount until the open area between the port 74 and the tapered portion 59 of the rod 50 is sufficient to accommodate the fluid flow. The axial displacement of the piston assembly 60 in turn rotates the shaft 100 with its attached needle 106 via the lever 98. The position of the needle 106 on the scale 162 is proportional to the axial position of the piston assembly 60 and thus proportional to the volumetric flow rate through the flow meter 10.

Figure 4:
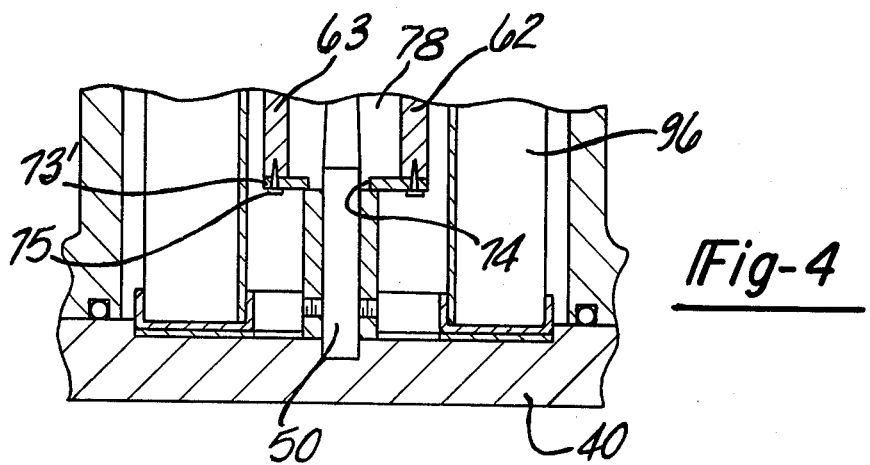
FIG. 4 is a fragmentary sectional view illustrating the flow meter of the present invention adjusted to a different flow range.

Referring now to FIG. 4, the flow range of the flow meter 10, however, can be rapidly and easily adjusted as desired by removing the cover plate 40 and thereafter removing the orifice plate 73 from the housing 12.

Thereafter, a new orifice plate 73' having a different size port 74 is secured to the body 63 of the first piston part 62 and the cover 40 is then reassembled to the housing 12. The provision of a new orifice plate 73' with a larger diameter port 74 would, in effect, reset the flow range for the flow meter 10 to a higher range since no or only minimal axial displacement of the piston assembly 60 would occur until a relatively higher flow rate through the flow meter is present. Conversely, the flow range for the flow meter 10 could be reduced to a lower range by substituting another orifice plate 73'' having a port 74 of a smaller diameter.

Alternatively, the entire piston assembly 60 with its attached rod 50 can be removed from the housing 12 after removal of the end cover 40 and replaced with a new piston assembly 60 and rod 50 in order to change the flow range of the flowmeter 10. The spring constant and compression of the helical spring 88, the taper of the rod tapered portion 59 and the size of the port 74 all affect the flow range of the flow meter 10. The replacement of the entire piston assembly 60 with its attached rod 50 is particularly advantageous when the flow range of the flow meter is to be changed in the field, i.e. after the flow meter 10 has been installed in a fluid system. In this case, the piston assembly 60 can be assembled and accurately calibrated at the factory and then easily, simply and rapidly installed in the field.

From the foregoing, it can be seen that the flow meter 10 according to the present invention provides a novel flow meter which is simple and relatively inexpensive in construction. Moreover, since the flow range of the flow meter 10 can be readily and simply varied by merely replacing the orifice plate 73, the flow meter 10 can be readily adapted for virtually any desired fluid flow range.

Having described my invention, however, many modifications thereto will become apparent to those skilled in the art to which the invention pertains without deviation from the spirit of the invention as defined by the scope of the appended claims.

I claim:

1. A fluid flow meter comprising:
   a housing having a fluid inlet and a fluid outlet radially disposed in said housing;
   fluid passage means formed through said housing for connecting said inlet with said outlet, said passage means including an elongated chamber and means connecting one end to the inlet and its other end to the outlet;
   a piston assembly axially slidably mounted in said housing chamber and movable between a first and a second position;
   means for fluidly sealing said piston assembly to said housing;
   said piston assembly further comprising an orifice plate having a fluid port open to the inlet end of said chamber, said orifice plate being removable from said piston assembly, and means formed through said piston assembly for fluidly connecting said port to the outlet end of said chamber;
   means for resiliently urging said piston assembly toward the inlet end of the chamber;
   a rod held in said housing and extending axially through at least a portion of said chamber, said rod having a tapered portion which extends through said port and variably restricts said port in dependence upon the axial position of said piston assembly;
   means for exteriorly indicating the axial position of the piston assembly; and
   said housing having a removable end cover on an axial end of the chamber on the side of the piston assembly opposite the resilient urging means,
   said orifice plate being removable from said piston assembly and removable from said housing without disturbing or replacing said piston assembly or said rod when said end cover is removed from said housing whereby said orifice plate can be replaced with another orifice plate having a different size port to thereby change the flow range of the flow meter.

2. A fluid flow meter comprising:
   a housing having a fluid inlet and a fluid outlet;
   fluid passage means formed through said housing for connecting said inlet with said outlet, said passage means including an elongated chamber having one end open to the inlet and its other end open to the outlet;
   a piston assembly axially slidably mounted in said housing chamber and movable between a first and a second position;
   means for fluidly sealing said piston assembly to said housing;
   said piston assembly further comprising a fluid port open to the inlet end of said chamber;
   means formed through said piston assembly for fluidly connecting said port to the outlet end of said chamber;
   means for resiliently urging said piston assembly toward the inlet end of the chamber;
   a rod held in said housing and extending axially through at least a portion of said chamber, said rod having a tapered portion which extends through said port and variably restricts said port in dependence upon the axial position of said piston assembly;
   means for exteriorly indicating the axial position of the piston assembly; and
   said housing having a removable end cover on one axial end of the chamber through which the piston assembly and attached rod are removable as a unit and replaceable with a different piston assembly and attached rod to thereby change the flow range of the flow meter.

3. A fluid flow meter comprising:
   a housing having a fluid inlet and a fluid outlet;
   fluid passage means formed through said housing for connecting said inlet with said outlet, said passage means including an elongated chamber having one end open to the inlet and its other end open to the outlet;
   a piston assembly axially slidably mounted in said housing chamber;
   means for fluidly sealing said piston assembly to said housing;
   said piston assembly further comprising an orifice plate having a fluid port open to the inlet end of said chamber, said orifice plate being removable from said piston assembly, and means formed through said piston assembly for fluidly connecting said port to the outlet end of said chamber;
   means for resiliently urging said piston assembly toward the inlet end of the chamber;
   a rod held in said housing and extending axially through at least a portion of said chamber, said rod having a tapered portion which extends through said port and variably restricts said port in dependence upon the axial position of said piston assembly;

means for exteriorly indicating the axial position of the piston assembly; and said housing having a removable end cover on one axial end of the chamber through which the orifice plate is removable and replaceable with another orifice plate having a different size port to thereby change the flow rate of the flow meter;

said piston assembly further comprising a first piston part and a second piston part, said orifice plate being secured to said first piston part, and said piston parts being axially adjacent and coaxially slidably mounted on said rod;

said fluid connecting means being formed wholly through said first piston part; and said second piston part abutting at one end against said first piston part and including a cavity through which said rod extends, said resilient means being positioned in said cavity and spring stop means secured to said rod adjacent the other end of the second piston part so that said resilient means is entrapped between said spring stop means and said first piston part.

4. The invention as defined in claim 3 wherein said fluid connecting means further comprises an interior chamber formed in said first piston part and open to said port and a plurality of circumferentially spaced and substantially radially extending fluid passageways formed through said first piston part, each of said passageways open at one end to said interior piston chamber and at their other end open to the outlet end of the housing chamber.

5. The invention as defined in claim 3 wherein said resilient means comprises a helical spring coaxially disposed around said rod.

6. The invention as defined in claim 3 wherein said indicating means further comprises a shaft rotatably mounted in said housing, an elongated lever connected at one end to the shaft and at its other end to said piston assembly so that axial displacement of said piston assembly proportionately rotates said shaft, and means connected to said shaft for indicating the rotation of said shaft.

7. The invention as defined in claim 6 wherein said means for indicating the rotation of the shaft comprises a needle secured to said shaft.

8. The invention as defined in claim 6 and further comprising means for activating an electric switch when said shaft achieves a predetermined rotational position.

9. The invention as defined in claim 8 wherein said activating means further comprises a cam secured to said shaft and a cam follower secured to said switch, the position of said cam follower controlling the activation of the switch.

10. A fluid flow meter comprising:

a housing having a fluid inlet and a fluid outlet;

fluid passage means formed through said housing for connecting said inlet with said outlet, said passage means including an elongated chamber having one end open to the inlet and its other end open to the outlet;

a piston assembly axially slidably mounted in said housing chamber;

means for fluidly sealing said piston assembly to said housing;

means formed through said piston assembly for fluidly connecting said port to the outlet end of said chamber;

means for resiliently urging said piston assembly toward the inlet end of the chamber;

a rod held in said housing and extending axially through at least a portion of said chamber, said rod having a tapered portion which extends through said port and variably restricts said port in dependence upon the axial position of said piston assembly;

means for exteriorly indicating the axial position of the piston assembly; and said piston assembly further comprising a first piston part and a second piston part, said piston parts being axially adjacent and coaxially slidably mounted on said rod;

said second piston part abutting at one end against said first piston part and including a cavity through which said rod extends, said resilient means being positioned in said cavity and spring stop means secured to said rod adjacent the other end of the second piston part so that said resilient means is entrapped between said spring stop means and said first piston part.

11. The invention as defined in claim 10 wherein said resilient means comprises a helical spring coaxially disposed around said rod.

12. The invention as defined in claim 10 and further comprising fluid filtering means operatively disposed between said fluid inlet and said housing chamber.

13. The invention as defined in claim 12 wherein said fluid filtering means further comprises a filter element sandwiched in between said end cover and a portion of said housing.

14. The invention as defined in claim 10 wherein said fluid connecting means are formed wholly through said first piston part.

* * * * *

UNITED STATES PATENT AND TRADEMARK OFFICE
CERTIFICATE OF CORRECTION

PATENT NO. : 4,282,761

DATED : August 11, 1981

INVENTOR(S) : Nils O. Rosaen

It is certified that error appears in the above—identified patent and that said Letters Patent is hereby corrected as shown below:

Column 3, line 55, "83" should read -- 84 --.

Signed and Sealed this

Fifteenth Day of December 1981

[SEAL]

Attest:

Attesting Officer

GERALD J. MOSSINGHOFF

Commissioner of Patents and Trademarks